United States Patent [19]

Takahasi

[11] Patent Number: 4,909,209

[45] Date of Patent: Mar. 20, 1990

[54] APPARATUS FOR INJECTING LP GAS INTO DIESEL ENGINE

[75] Inventor: Yositeru Takahasi, Takamatsu, Japan

[73] Assignee: Nihon Kankyo Denso Co., Ltd., Kagawa, Japan

[21] Appl. No.: 366,132

[22] Filed: Jun. 14, 1989

[30] Foreign Application Priority Data

Jun. 17, 1988 [JP] Japan .................................. 63-150546

[51] Int. Cl.$^4$ ............................................. F02B 3/00
[52] U.S. Cl. .................................. 123/27 GE; 123/527
[58] Field of Search ............................ 123/27 GE, 527

[56] References Cited

U.S. PATENT DOCUMENTS 4,638,783  1/1987  Snyder ........................... 123/27 GE
4,704,997 11/1987  Endo et al. ..................... 123/27 GE
4,817,568  4/1989  Bedford ........................ 123/27 GE Primary Examiner—E. Rollins Cross
Attorney, Agent, or Firm—Wenderoth, Lind & Ponack

[57] ABSTRACT

An important for a diesel engine by injecting LP gas into the diesel engine. A solenoid valve and a pressure controller are provided in a line between an LP gas cylinder and a gas injector mounted on the air inlet of the diesel engine. The solenoid valve is activated only when the engine temperature has risen above a predetermined level and only after the vehicle speed has exceeded a predermined level. This arrangement increases the output of the diesel engine, saves the fuel cost and eliminates black smoke.

1 Claim, 1 Drawing Sheet

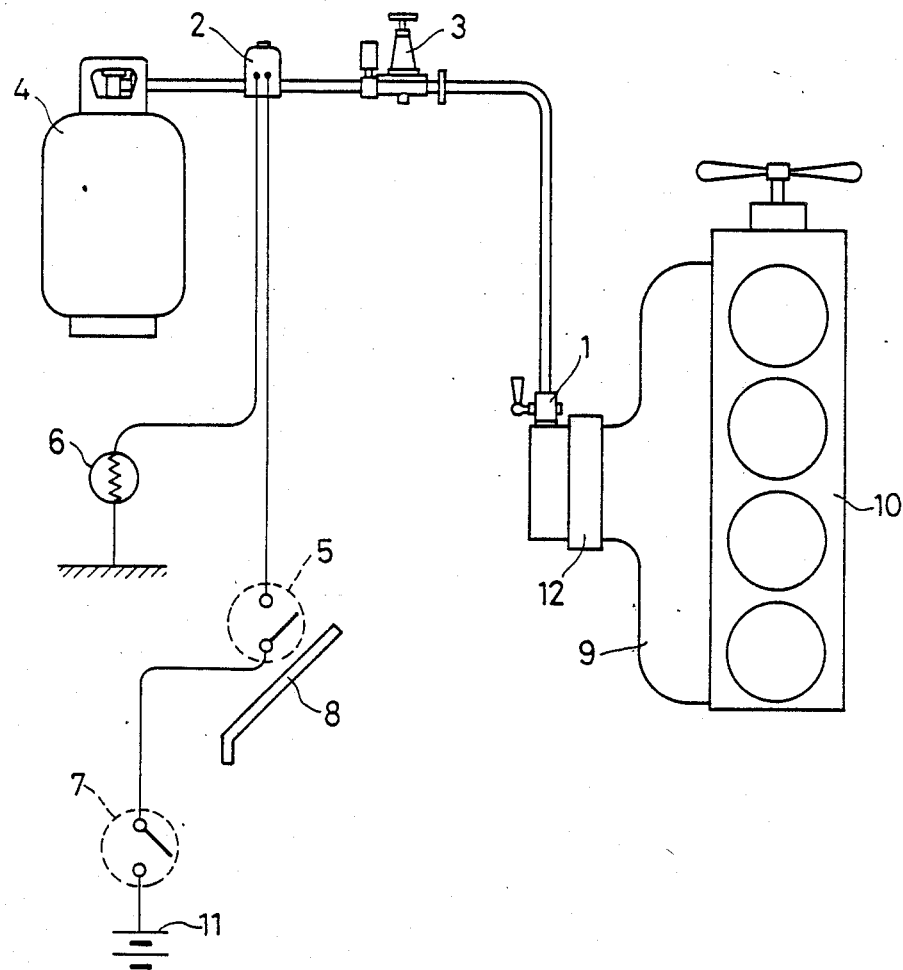

APPARATUS FOR INJECTING LP GAS INTO DIESEL ENGINE

The present invention relates to an apparatus for injecting LP gas into a diesel engine which can increase its output, reduce the fuel consumption and eliminate the production of black smoke.

In order to accomplish the above-mentioned purposes, the combustion in the engine has to be as complete as possible. One method for improving the combustion efficiency was to increase the gas pressure by use of e.g. a supercharger.

According to the present invention, LP gas is injected into a diesel engine and detonated to increase its output and accomplish the above-mentioned purposes.

In accordance with the present invention, there is provided an apparatus for injecting LP gas into a diesel engine, comprising an injector nozzle mounted on the air inlet of the diesel engine and having an adjustable inner diameter, a cylinder containing LP gas, a solenoid valve and a pressure controller provided in a line between said cylinder and said LP gas injector, a thermostat for activating said solenoid valve only when the engine has heated up to a predetermined level, and a stop switch for activating said solenoid valve only when the vehicle speed has risen above a predetermined level.

Other objects and features of the present invention will become apparent from the following description taken with reference to the accompanying drawing, in which:

FIG. 1 is a schematic view of the apparatus according to the present invention.

Now referring to the single drawing, an LP gas injection nozzle 1 is mounted on the air inlet of a diesel engine 10. It should be adjusted to an inner diameter of about 1.10 mm if the engine is a 2000 cc class diesel engine. In the line between an LP gas cylinder 4 and the diesel engine 10, there are provided a solenoid valve 2 adapted to be activated upon the closing of an ignition switch 7 and a pressure controller 3 for adjusting the supply pressure of LP gas from the cylinder 4. It should be adjusted to about 1.5 kg/cm$^2$. When the engine temperature rises above 50 C., a thermostat 6 will be closed to activate the solenoid valve 2. Also, while the engine speed is lower than a predetermined point, a stop switch 5 attached to an accelerator pedal 8 is kept open, thus keeping the solenoid valve 2 deactivated and holding back the supply of LP gas.

It was observed that when an LP gas having an estimated octane value of 120 was injected into the diesel engine, the combustion efficiency increased drastically and the response of the engine improved, too. Also it was found out that a 2000 cc diesel turbo engine vehicle equipped with the apparatus according to the present invention could climb up a steep slope at a speed of up to 60 km/h, whereas the same vehicle not equipped with the apparatus of the present invention could not go up the same slope in the same gear at a higher speed than 30 km/h.

Also the vehicle equipped with the apparatus according to the present invention was found out to shorten the time required to accelerate from 60 km/hour to 100 km/hour by 2 or 3 seconds. Further, according to the present invention, since the shaft output increases as a result of the improvement in the combustion efficiency, the amount of fuel left unburned and exhausted in the form of black smoke can be reduced to a minimum by reducing the size of a fuel injection pump. Thus the fuel consumption rate will decrease.

The injection rate of LP gas into the engine can be controlled by the pressure controller 3 and the injection nozzle 1 to about 10 per cent of the total amount of fuel injected into the engine so that knocking will not occur. The thermostat 6 and the stop switch 5 serve in cooperation with each other to activate the solenoid valve 2 and inject the LP gas into the engine only during normal operating conditions.

The apparatus according to the present invention will not only increase the slope-climbing ability of a diesel engine vehicle, especially a diesel engine truck which tends to cause a traffic congestion at a steep upward slope because of its poor slope-climbing ability, but also reduce the production of black smoke which is suspected to trigger cancer.

Other parts numbered in the drawing are an intake manifold 9, a battery 11, and an air element 12.

What is claimed is:

1. An apparatus for injecting LP gas into a diesel engine, comprising an injector nozzle mounted on the air inlet of the diesel engine and having an adjustable inner diameter, a cylinder containing LP gas, a solenoid valve and a pressure controller provided in a line between said cylinder and said LP gas injector, a thermostat for activating said solenoid valve only when the engine has heated up to a predetermined level, and a stop switch for activating said solenoid valve only when the vehicle speed has risen above a predetermined level.

* * * * *